(12) United States Patent
Hori et al.

(10) Patent No.: US 10,420,057 B2
(45) Date of Patent: Sep. 17, 2019

(54) COMMUNICATION SYSTEM, RELAY TERMINAL, REMOTE TERMINAL, AND COMMUNICATION CONTROL METHOD

(71) Applicant: Panasonic Intellectual Property Corporation of America, Torrance, CA (US)

(72) Inventors: Takako Hori, Kanagawa (JP); Masayuki Hoshino, Chiba (JP); Joachim Loehr, Hessen (DE); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/916,138

(22) Filed: Mar. 8, 2018

(65) Prior Publication Data

US 2018/0199301 A1 Jul. 12, 2018

Related U.S. Application Data

(63) Continuation of application No. PCT/JP2016/003853, filed on Aug. 24, 2016.

(30) Foreign Application Priority Data

Sep. 24, 2015 (JP) .................... 2015-187150

(51) Int. Cl.
*H04W 4/10* (2009.01)
*H04W 60/00* (2009.01)
(Continued)

(52) U.S. Cl.
CPC ............ *H04W 60/00* (2013.01); *H04B 7/155* (2013.01); *H04L 65/4061* (2013.01);
(Continued)

(58) Field of Classification Search
CPC ....... H04W 60/00; H04W 16/26; H04W 4/10; H04W 76/14; H04W 88/16; H04W 4/16;
(Continued)

(56) References Cited

U.S. PATENT DOCUMENTS

2017/0302360 A1* 10/2017 Aminaka .............. H04W 80/02
2018/0048986 A1* 2/2018 Adachi ................... H04W 8/00

FOREIGN PATENT DOCUMENTS

JP 50-236561 * 5/1984 .............. H04L 11/18
JP 60-236561 A 11/1985

OTHER PUBLICATIONS

3GPP TSG-SA#69, Sep. 2015, SP-150483 (Mission Critical Push to Talk over LTE (MCPTT).*
(Continued)

*Primary Examiner* — Lakeram Jangbahadur
(74) *Attorney, Agent, or Firm* — Seed IP Law Group LLP

(57) ABSTRACT

A remote UE transmits a first signaling for user registration of the remote UE into an MCPTT server. The MCPTT server detects a relationship of connection between the remote UE that transmitted the first signaling and a relay UE to which the remote UE is connected. Upon receiving voice data from a UE given a floor grant, the MCPTT server determines, as a destination UE of the voice data, only one of the relay UE and the remote UE that have the relationship of connection. The MCPTT server transmits the voice data with use of a unicast bearer for the destination UE. The relay UE transmits, to all of the remote UEs connected to the relay UE, the voice data that is transmitted from the MCPTT server.

15 Claims, 9 Drawing Sheets

(51) Int. Cl.
  H04W 16/26    (2009.01)
  H04B 7/155    (2006.01)
  H04L 29/06    (2006.01)
  H04L 29/08    (2006.01)
  H04W 4/16     (2009.01)
  H04W 88/04    (2009.01)
  H04W 88/16    (2009.01)
  H04W 76/14    (2018.01)

(52) U.S. Cl.
  CPC ............ *H04L 67/025* (2013.01); *H04W 4/10* (2013.01); *H04W 16/26* (2013.01); *H04B 7/15507* (2013.01); *H04L 67/16* (2013.01); *H04W 4/16* (2013.01); *H04W 76/14* (2018.02); *H04W 88/04* (2013.01); *H04W 88/16* (2013.01)

(58) Field of Classification Search
  CPC .... H04W 88/04; H04L 65/4061; H04L 67/16; H04B 7/155; H04B 7/15507
  See application file for complete search history.

(56) References Cited

OTHER PUBLICATIONS

International Search Report of PCT application No. PCT/JP2016/003853 dated Nov. 8, 2016.
3GPP TSG SA #69,TD SP-150483, "Presentation of TR 23.779 v2.0.0: Study on application architecture to support Mission Critical Push to Talk over LTE (MCPTT) services (Release13)", Sep. 2015.
3GPP TS 22.179 v13.2.0, "3rd Generation Partnership Project; Technical Specification Group Services and System Aspects; Mission Critical Push to Talk (MCPTT) over LTE; Stage 1", Jun. 2015.
3GPP TS 22468 v13.0.0, "3rd Generation Partnership Project; Technical Specification Group Services and System Aspects; Group Communication System Enablers for LTE (GCSE_LTE)", Dec. 2014.
3GPP TS 23.468 v13.1.0, "3rd Generation Partnership Project; Technical Specification Group Services and System Aspects; Group Communication System Enablers for LTE (GCSE_LTE); Stage 2", Jun. 2015.
3GPP TS 22.278 v13.2.0, "3rd Generation Partnership Project; Technical Specification Group Services and System Aspects; Service requirements for the Evolved Packet System (EPS)", Dec. 2014.
3GPP TR 23.713 v1.5.0, "3rd Generation Partnership Project; Technical Specification Group Services and System Aspects; Study on extended architecture support for proximity-based services", Jul. 2015.
3GPP TS 23303 v13.0.0, "3rd Generation Partnership Project; Technical Specification Group Services and System Aspects; Proximity-based services (ProSe); Stage 2", Jun. 2015.
3GPP TS 36321 v12.6.0, "3rd Generation Partnership Project; Technical Specification Group Radio Access Network; Evolved Universal Terrestrial Radio Access (E-UTRA); Medium Access Control (MAC) protocol specification", Jun. 2015.
3GPP TR 23.779 v1.1.0, "3rd Generation Partnership Project; Technical Specification Group Services and System Aspects; Study on application architecture to support Mission Critical Push to Talk over LTE (MCPTT) services", Aug. 2015.
3GPP TS 23.179 v0.3.0, "3rd Generation Partnership Project; Technical Specification Group Services and System Aspects; Functional architecture and information flows to support mission critical communication services; Stage 2", Aug. 2015.
3GPP TS 23A01 v13.3.0, "3rd Generation Partnership Project; Technical Specification Group Services and System Aspects; General Packet Radio Service (GPRS) enhancements for Evolved Universal Terrestrial Radio Access Network (E-UTRAN) access", Jun. 2015.
3GPP TS 36.300 v13.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", Jun. 2015.
3GPP TS 23.246 v13.1.0, "3rd Generation Partnership Project; Technical Specification Group Services and System Aspects; Multimedia Broadcast/Multicast Service (MBMS); Architecture and functional description", Jun. 2015.
SA WG2 #109, S2-151810, "LS reply on ProSe Priorities", May 2015.

* cited by examiner

COMMUNICATION SYSTEM, RELAY TERMINAL, REMOTE TERMINAL, AND COMMUNICATION CONTROL METHOD

BACKGROUND

1. Technical Field

The present disclosure relates to a communication system, a relay terminal, a remote terminal, and a communication control method.

2. Description of the Related Art

The standardization of MCPTT (Mission Critical Push To Talk) is currently in progress under the 3GPP (3rd Generation Partnership Project).

3GPP TS 22.179 v13.2.0, "Mission Critical Push to Talk (MCPTT) over LTE; Stage 1" prescribes requirements for formulating the details of MCPTT services and systems. According to 3GPP TS 22.179 v13.2.0, "Mission Critical Push to Talk (MCPTT) over LTE; Stage 1", possible MCPTT services include an on-network service, an off-network service, or a service that involves the use of both the on-network service and the off-network service.

The on-network service is a service that involves the use of GCSE_LTE (Group Communication System Enablers for LTE: See, for example, 3GPP TS 22.468 v13.0.0, "Group Communication System Enablers for LTE (GCSE_LTE)" and 3GPP TS 23.468 v13.1.0, "Group Communication System Enablers for LTE (GCSE_LTE); Stage 2"), which performs communication by utilizing the EPS (Evolved Packet System) composed of an LTE (Long Term Evolution) radio access network (eUTRAN: Evolved Universal Terrestrial Radio Access Network) and a core network (EPC: Evolved Packet Core). According to 3GPP TS 22.468 v13.0.0, "Group Communication System Enablers for LTE (GCSE_LTE)" and 3GPP TS 23.468 v13.1.0, "Group Communication System Enablers for LTE (GCSE_LTE); Stage 2", in communication based on GCSE_LTE, unicast communication based on an EPS bearer described in 3GPP TS 23.401 v13.3.0, "General Packet Radio Service (GPRS) enhancements for Evolved Universal Terrestrial Radio Access Network (E-UTRAN) access" or 3GPP TS 36.300 v13.0.0, "Evolved Universal Terrestrial Radio Access (E-UTRA) and Evolved Universal Terrestrial Radio Access Network (E-UTRAN); Overall description; Stage 2" may be performed and MBMS communication based on an MBMS (Multimedia Broadcast and Multicast Service) bearer described in 3GPP TS 23.246 v13.1.0, "Multimedia Broadcast/Multicast Service (MBMS); Architecture and functional description" may be performed on each terminal (UE: user equipment) participating in a group service such as MCPTT.

Further, the off-network service is a service that involves the use of ProSe (Proximity Services: See, for example, 3GPP TS 22.278 v13.2.0, "Service requirements for the Evolved Packet System (EPS)", 3GPP TR 23.713 v1.5.0, "Study on extended architecture support for proximity services", 3GPP TS 23.303 v13.0.0, "Proximity-based services (ProSe); Stage 2", and 3GPP TR 36.321 v12.6.0, "Evolved Universal Terrestrial Radio Access (E-UTRA); Medium Access Control (MAC) protocol specification"), which is interterminal direct communication. Prose communication is also called sidelink communication.

An example of the service that involves the use of both the on-network service and the off-network service is a service that involves the use of a UE-to-Network relay described in 3GPP TS 22.179 v13.2.0, "Mission Critical Push to Talk (MCPTT) over LTE; Stage 1", 3GPP TS 23.303 v13.0.0, "Proximity-based services (ProSe); Stage 2", 3GPP TS 23.179 v0.3.0, "Functional architecture and information flows to support mission critical communication services; Stage 2", and the like. The service that involves the use of a UE-to-Network relay is a service in which a UE that is present in the coverage of a base station (eNB: eNode B) functions as a relay UE that relays communication between a UE (remote UE) that is present outside the coverage of the eNB and the EPC. In this service, the off-network service based on ProSe communication is performed between the relay UE and the remote UE, and the on-network service based on GCSE_LTE is performed between the relay UE and the EPC.

Further, according to 3GPP TS 22.179 v13.2.0, "Mission Critical Push to Talk (MCPTT) over LTE: Stage 1", the UE of a user who enjoys the provision of an MCPTT service belongs to a group of MCPTT services. The UE may belong to a plurality of groups at one time.

In an MCPTT service, support for floor control is required, and only a user given a floor grant in a group is permitted to speak. Further, restrictions may be put on the time during which the user is given this floor grant. Further, at the time of occurrence of an emergency situation or the like, permitting pre-emption is required. In a case where pre-emption occurs, the existing MCPTT service is suspended, and the floor grant is yielded to pre-emption. 3GPP TR 23.779 v1.1.0, "Study on application architecture to support Mission Critical Push To Talk over LTE (MCPTT) services" and 3GPP TS 23.179 v0.3.0, "Functional architecture and information flows to support mission critical communication services; Stage 2" disclose examples of the architecture and signaling of MCPTT services, including registration into an MCPTT service group, floor control, and allocation of resources to a network.

FIG. 1 shows an example of the architecture of an MCPTT service based on a UE-to-Network relay and an example of a path through which voice data (voice packet) passes, as conceived from 3GPP TS 22.179 v13.2.0, "Mission Critical Push to Talk (MCPTT) over LTE; Stage 1", 3GPP TS 23.303 v13.0.0, "Proximity-based services (ProSe); Stage 2", 3GPP TS 23.179 v0.3.0, "Functional architecture and information flows to support mission critical communication services; Stage 2", and the like.

The MCPTT server shown in FIG. 1 has the function of an SIP (Session Initiation Protocol) server that performs the registration of a user who participates in an MCPTT service or the control of an MCPTT session, the function of a floor control server that performs floor control, a media distribution function that terminates voice data from a speaker once and relays it to MCPTT service participants, the ProSe function described in 3GPP TS 23.303 v13.0.0, "Proximity-based services (ProSe); Stage 2", and similar functions. Although these servers and functions may be decentrally present at other nodes under different names, the present disclosure assumes, for simplicity of the drawing, that these servers and functions are present as part of the function of the MCPTT server.

In FIG. 1, the UE1, the UE2, the UE3, the UE4, and the UE5 are UEs that are participating in the same MCPTT service, the UE1 and the UE2 are present in the coverage of an eNB, and the UE3, the UE4, and the UE5 are present outside the coverage of the eNB. Further, the UE2 functions as a relay UE, and the UE3, the UE4, and the UE5 are participating in the MCPTT service as remote UEs. In the example shown in FIG. 1, the UE1 is currently speaking under a floor grant, and the UE2 to UE5 are receiving the speech (voice packet) of the UE1.

Further, when a remote UE (UE3, UE4, or UE5) connects to a relay UE (UE2), the following procedures, described in 3GPP TS 23.303 v13.0.0, "Proximity-based services (ProSe); Stage 2", 3GPP TS 23.179 v0.3.0, "Functional architecture and information flows to support mission critical communication services; Stage 2", and the like, are taken:

1. The relay UE allocates an IP address to the remote UE. In a case where the IP address is an IPv4 address, the relay UE has the function of NAT (Network Address Translation) with respect to the remote UE.

2. The remote UE performs user registration on the SIP server via the relay UE.

3. The remote UE sends INVITE, which is an SIP call control signaling, to the SIP server to start MCPTT communication.

In the example shown in FIG. 1, each of the UE3 to UE5, which are remote UEs, independently performs user registration on the MCPTT server to independently start MCPTT communication.

Further, according to 3GPP TS 23.303 v13.0.0, "Proximity-based services (ProSe); Stage 2", the relay UE relays only a packet of unicast communication from the EPC to the remote UE and does not relay a packet of MBMS communication. That is, each remote UE needs to establish an EPS bearer with the EPC via the relay UE to perform unicast communication.

Therefore, in the example shown in FIG. 1, the MCPTT server copies, for each of the UE3, the UE4, and the UE5, the voice packet that the UE1 transmitted to the MCPTT server, appends the respective IP/UDP headers of the UE3, the UE4, and the UE5, and transmits the packets to the UE3, the UE4, and the UE5. Further, the UE2, which is a relay UE in FIG. 1, uses ProSe communication to transmit, to the UE3, the UE4, and the UE5, the packets sent to the UE3, the UE4, and the UE5, respectively.

However, according to 3GPP TS 23.303 v13.0.0, "Proximity-based services (ProSe); Stage 2", 3GPP TR 36.321 v12.6.0, "Evolved Universal Terrestrial Radio Access (E-UTRA); Medium Access Control (MAC) protocol specification", and 3GPP TS 36.300 v13.0.0, "Evolved Universal Terrestrial Radio Access (E-UTRA) and Evolved Universal Terrestrial Radio Access Network (E-UTRAN); Overall description; Stage 2", in ProSe communication, a broadcast is performed on UEs allocated the same group ID (ProSe Layer-2 Group ID). That is, in a case where the UE3, the UE4, and the UE5, which are participating in the same MCPTT service, are allocated the same group ID, the packets that are sent to the UE3, the UE4, and the UE5, respectively, are distributed to all of the UE3, the UE4, and the UE5.

Usually, in a case where a UE has received a packet sent by means of a broadcast, the UE performs a process of confirming whether the packet is addressed to the UE and, in a case where the packet is not addressed to the UE, discarding the packet. However, in a case where the AMR (Adaptive MultiRate) or the AMR-WB (AMR-WideBand), which is an example of a 3GPP voice codec, or the like is used for voice packets, a packet is usually generated every 20 msec. This increases the frequency at which the UE confirms the destination of a packet and discards an unnecessary packet. Further, as the number of remote UEs allocated the same group ID becomes larger, the number of packets that each remote UE confirms and discards increases and the processing load of each remote UE increases.

Further, the transmission of many unnecessary packets from a relay UE to a remote UE results in wasteful consumption of radio resources.

SUMMARY

One non-limiting and exemplary embodiment provides a communication system, a relay terminal, a remote terminal, and a communication control method that make it possible to reduce consumption of core network resources and radio resources while suppressing an increase in processing load of a relay UE.

In one general aspect, the techniques disclosed here feature a communication system including: a communication node; and a plurality of terminals including a relay terminal and a remote terminal that communicates with the communication node via the relay terminal. Of the plurality of terminals, a terminal given a floor grant transmits voice data to the communication node and another terminal receives the voice data from the communication node. The remote terminal transmits a first signaling for user registration of the remote terminal into the communication node. The communication node detects a relationship of connection between the remote terminal that transmitted the first signaling and the relay terminal to which the remote terminal is connected. Upon receiving the voice data from the terminal given the floor grant, the communication node determines, as a destination terminal of the voice data, one of the relay terminal and the remote terminal that have the relationship of connection. The communication node transmits the voice data with use of a unicast bearer for the destination terminal. The relay terminal transmits, to all of the remote terminals connected to the relay terminal, the voice data that is transmitted from the communication node.

As aspect of the present disclosure makes it possible to reduce consumption of core network resources and radio resources while suppressing an increase in processing load of a relay UE.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the following, embodiments of the present disclosure are described in detail with reference to the drawings. It should be noted that in a case where the source or destination of a packet is not clearly specified as "unicast IP address", "broadcast IP address/multicast address/ProSe Group IP multicast address", or the like in the embodiments of the present disclosure, it means a unicast IP address.

Embodiment 1

Figure 1:
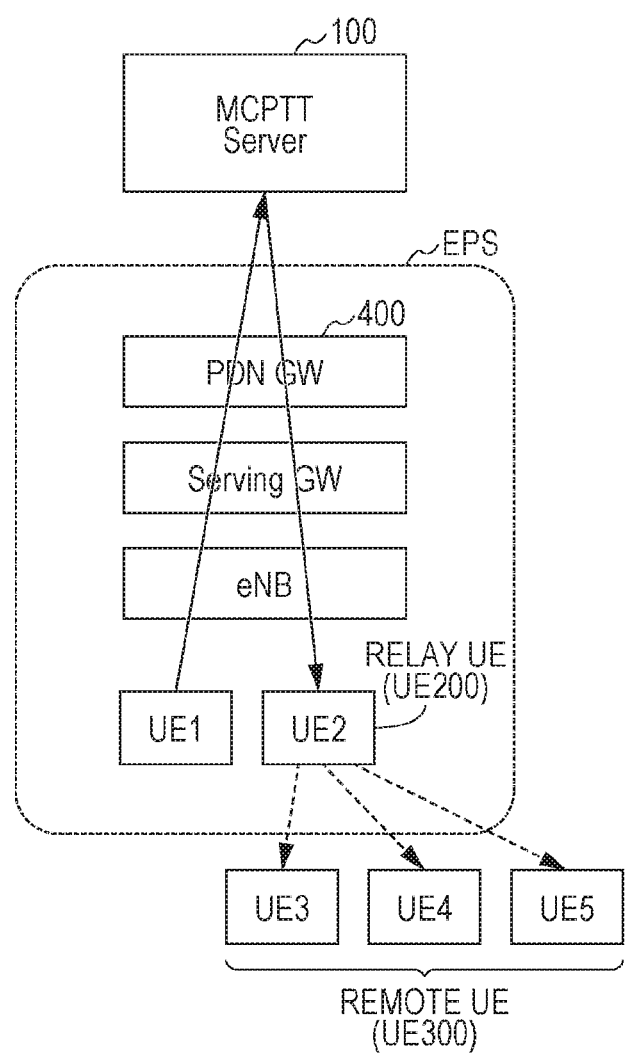
FIG. 1 is a diagram showing an example configuration of a communication system according to Embodiment 1.

A communication system according to Embodiment 1 employs a configuration shown in FIG. 1. The communication system according to Embodiment 1 includes at least an MCPTT server 100 (which corresponds to the communication node), a relay UE 200, and remote UEs 300.

Further, the PDN GW (Packet Data Network GateWay) 400 shown in FIG. 1 (and Serving GW) is/are a node(s) described in 3GPP TS 23.401 v13.3.0, "General Packet Radio Service (GPRS) enhancements for Evolved Universal Terrestrial Radio Access Network (E-UTRAN) access" and is/are paths through which voice data passes in the case of one-to-one distribution. Further, the eNB is a node described in 3GPP TS 23.401 v13.3.0, "General Packet Radio Service (GPRS) enhancements for Evolved Universal Terrestrial Radio Access Network (E-UTRAN) access" and the like and is a base station in the EPS.

In FIG. 1, the UE2, which is present in the coverage of the eNB, corresponds to the relay UE 200, and the UE3 to UE5, which are present outside the coverage of the eNB, correspond to the remote UEs 300.

Further, as mentioned earlier, it is assumed that the MCPTT server 100 shown in FIG. 1 has the function of an SIP (Session Initiation Protocol) server that performs the registration of a UE that participates in an MCPTT service or the control of an MCPTT session, the function of a floor control server that performs floor control, a media distribution function that relays data to MCPTT service participants, the ProSe function described in 3GPP TS 23.303 v13.0.0, "Proximity-based services (ProSe); Stage 2", and similar functions; however, in reality, these servers and functions may be decentrally present at nodes or functions under different names.

Configuration of Each Device

Figure 2:
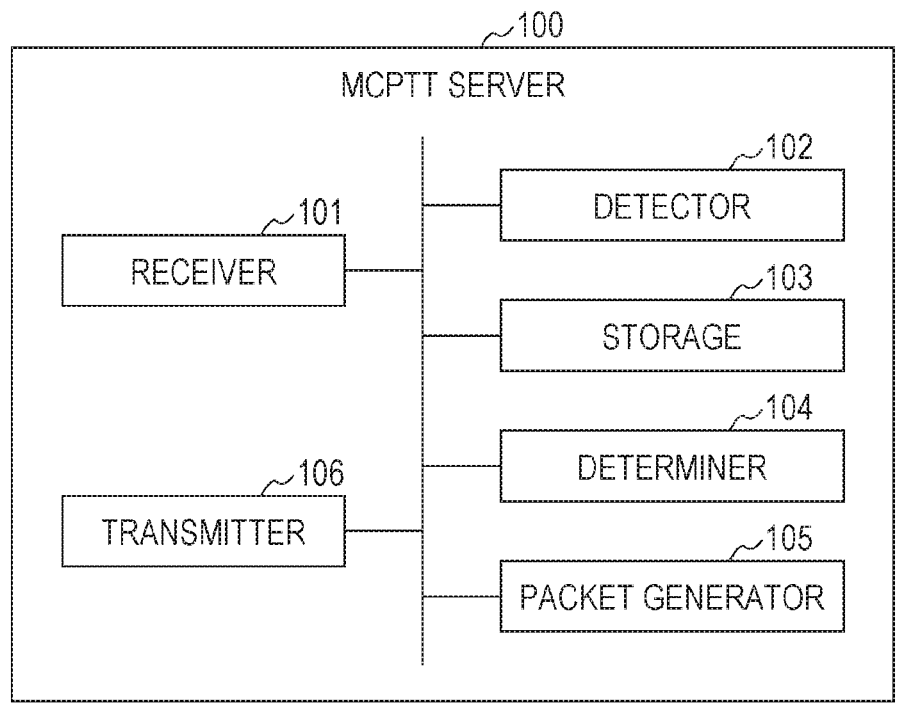
FIG. 2 is a diagram showing an example configuration of an MCPTT server according to Embodiment 1.
Figure 3:
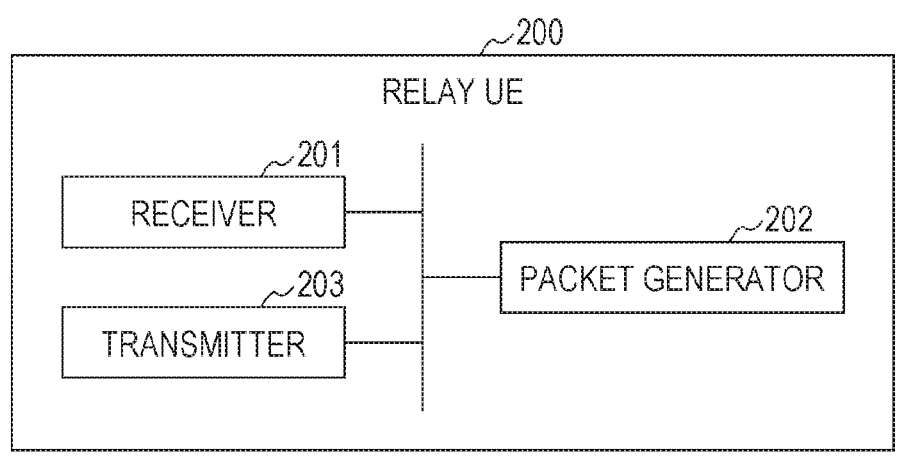
FIG. 3 is a diagram showing an example configuration of a relay UE according to Embodiment 1.
Figure 4:
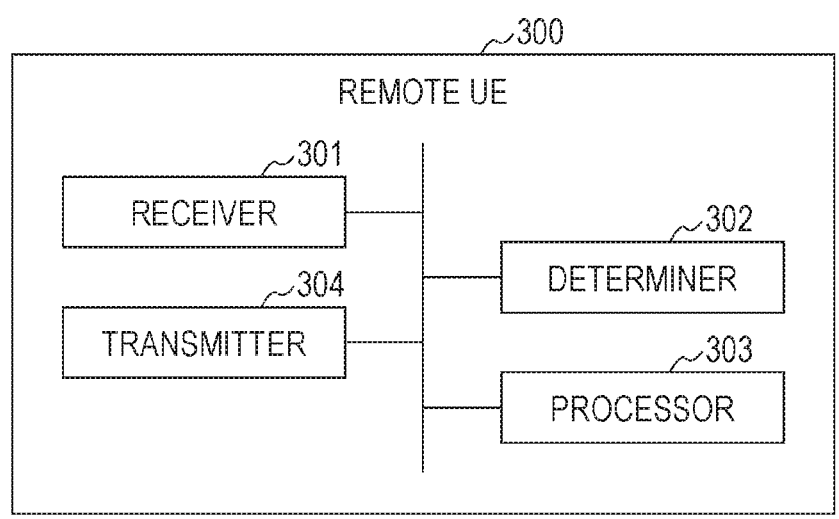
FIG. 4 is a diagram showing an example configuration of a remote UE according to Embodiment 1.

FIGS. 2 to 4 are block diagrams showing example configurations of the MCPTT server 100, the relay UE 200, and each of the remote UEs 300, respectively, which are shown in FIG. 1. It should be noted that although the MCPTT server 100, the relay UE 200, and the remote UEs 300 have such functions as those described in 3GPP TS 22.179 v13.2.0, "Mission Critical Push to Talk (MCPTT) over LTE: Stage 1", 3GPP TS 22.468 v13.0.0, "Group Communication System Enablers for LTE (GCSE_LTE)", 3GPP TS 23.468 v13.1.0, "Group Communication System Enablers for LTE (GCSE_LTE); Stage 2", 3GPP TS 22.278 v13.2.0, "Service requirements for the Evolved Packet System (EPS)", 3GPP TR 23.713 v1.5.0, "Study on extended architecture support for proximity services", 3GPP TS 23.303 v13.0.0, "Proximity-based services (ProSe); Stage 2", 3GPP TR 36.321 v12.6.0, "Evolved Universal Terrestrial Radio Access (E-UTRA); Medium Access Control (MAC) protocol specification", 3GPP TR 23.779 v1.1.0, "Study on application architecture to support Mission Critical Push To Talk over LTE (MCPTT) services", 3GPP TS 23.179 v0.3.0, "Functional architecture and information flows to support mission critical communication services; Stage 2", 3GPP TS 23.401 v13.3.0, "General Packet Radio Service (GPRS) enhancements for Evolved Universal Terrestrial Radio Access Network (E-UTRAN) access", and 3GPP TS 36.300 v13.0.0, "Evolved Universal Terrestrial Radio Access (E-UTRA) and Evolved Universal Terrestrial Radio Access Network (E-UTRAN); Overall description; Stage 2" in addition to the components shown in FIGS. 2 to 4, those functions are not described here.

As shown in FIG. 2, the MCPTT server 100 includes a receiver 101, a detector 102, a storage 103, a determiner 104, a packet generator 105, and a transmitter 106.

In the MCPTT server 100, the receiver 101 receives an SIP signaling that is transmitted from a UE at the time of user registration of the UE into the SIP server and, at the start of MCPTT service communication, receives an SIP INVITE signaling that is transmitted from a UE. Further, at the time of voice communication, the receiver 101 receives a voice packet transmitted from a UE given a floor grant (in FIG. 1, the UE1).

With use of the SIP signaling at the time of user registration as received from the receiver 101 or information on already-registered UEs, the detector 102 detects a relationship (relationship of connection) between the relay UE 200 and the remote UEs 300, which are participating in the same group service in the MCPTT service. The storage 103 stores the relationship detected by the detector 102.

The determiner 104 determines, at the start of communication from a remote UE 300, whether it is necessary to establish a bearer for the remote UE 300. Further, at the time of voice communication in the MCPTT service, the determiner 104 determines the destination UE of a voice packet on the basis of the information (i.e. the relationship between the relay UE 200 and the remote UEs 300) stored in the storage 103. For example, the determiner 104 determines, as the destination UE of the voice data, only one of the relay UE 200 (in FIG. 1, the UE2) and the remote UEs 300 (in FIG. 1, the UE3 to UE5) that have the relationship of connection stored in the storage 103.

The packet generator 105 generates a packet on the basis of a result of the determination (determination of the destination UE) made by the determiner 104, and the transmitter 106 transmits the packet generated by the packet generator 105.

As shown in FIG. 3, the relay UE 200 includes a receiver 201, a packet generator 202, and a transmitter 203.

In the relay UE 200, the receiver 201 receives a signal that is transmitted from a remote UE 300 or a signal that is transmitted from the MCPTT server 100.

The packet generator 202 generates a packet with use of a signal that the packet generator 202 receives from the receiver 201. For example, in order that all of the remote UEs 300 connected to the relay UE 200 can receive a voice packet that is transmitted from the MCPTT server 100, the packet generator 202 may change the header information of the voice packet to generate packets addressed to the remote UEs 300.

The transmitter 203 transmits the packets generated by the packet generator 202.

As shown in FIG. 4, each of the remote UEs 300 includes a receiver 301, a determiner 302, a processor 303, and a transmitter 304.

In the remote UE 300, the receiver 301 receives an SIP signaling at the time of user registration or at the start of communication or a voice packet at the time of communication.

The determiner 302 determines whether a voice packet that the determiner 302 receives from the receiver 301 is addressed to the remote UE 300. For example, in a case where a voice packet that is transmitted from the relay UE 200 is a voice packet transmitted from the remote UE 300, the determiner 302 determines that the voice packet is not addressed to the remote UE 300.

The processor 303 performs a process (e.g. the exchange of data with an higher-layer processor (not illustrated)) on a voice packet addressed to the remote UE 300. Meanwhile, the processor 303 discards a voice packet not addressed to the remote UE 300 (e.g. a voice packet transmitted by the remote UE 300).

The transmitter 304 transmits an SIP signaling at the time of user registration or at the start of communication or a voice packet at the time of giving of a floor grant.

The operation in the communication system thus configured is described in detail.

Registration Processing of Remote UE

The operation of each device at the time of registration processing of a remote UE 300 is described with reference to FIGS. 2 and 5.

Figure 5:
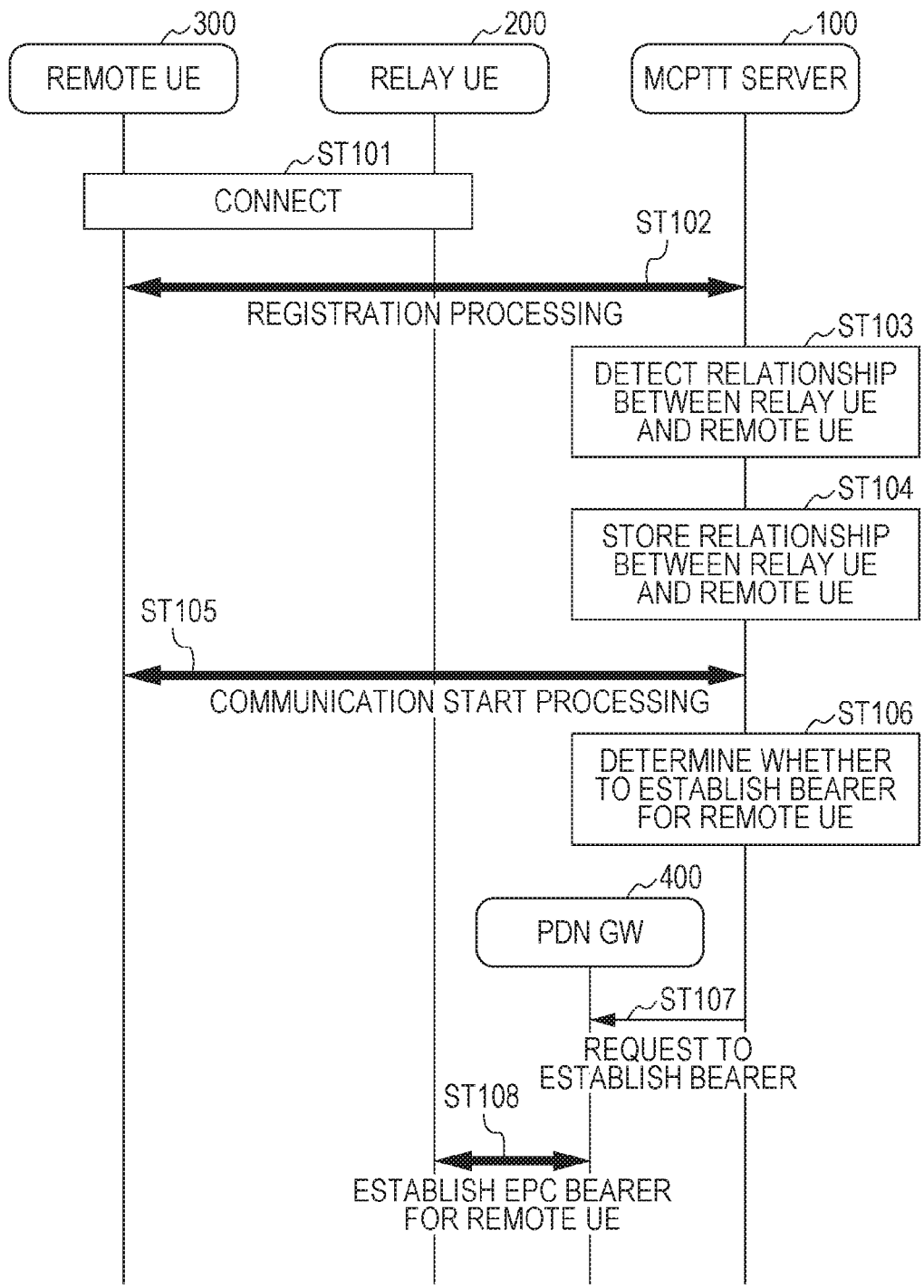
FIG. 5 is a sequence chart showing an operation at the time of registration processing of a remote UE according to Embodiment 1.

FIG. 5 is a sequence chart showing an example of an operation at the time of registration processing of a remote UE 300 according to Embodiment 1. It should be noted that, in FIG. 5, for example, the remote UE 300 is any of the UE3 to UE5 shown in FIG. 1 and the relay UE 200 is the UE2 shown in FIG. 1.

In FIG. 5, the remote 300 connects to the relay UE 200 as described in 3GPP TS 23.179 v0.3.0, "Functional architecture and information flows to support mission critical communication services; Stage 2" and the like (step (hereinafter denoted as "ST") 101). When the remote UE 300 connects to the relay UE 200, the remote UE 300 is allocated an IP address (or an IP address prefix) from the relay UE 200. The remote UE 300 performs SIP signaling based registration processing on the MCPTT server 100 with use of the IP address thus allocated (or an IP address generated from the IP address prefix thus allocated) (ST102).

In performing the registration processing, the remote UE 300 may explicitly include, into a registration processing SIP signaling, information on the relay UE 200 to which the remote UE 300 is connected. For example, the remote UE 300 may include, into a part of the SIP header, such as a via header, or the SDP (Session Description Protocol), the information on the relay UE 200 to which the remote UE 300 is connected. Further, the remote UE 300 may inform the SIP server of the relationship between the remote UE 300 and the relay UE 200 by including the aforementioned group ID, a ProSe Group IP multicast address that is allocated together with the group ID, described in 3GPP TS 23.303 v13.0.0, "Proximity-based services (ProSe); Stage 2", or both the group ID and the ProSe Group IP multicast address into the SIP signaling.

It should be noted that parameter changes or additions may be made by the relay UE 200 to the registration processing SIP signaling. In this case, instead of the remote UE 300 explicitly including, into the registration processing SIP signaling, the information on the relay UE 200 to which the remote UE 300 is connected, as mentioned above, the relay UE 200 explicitly includes the information on the relay UE 200 into the registration processing SIP signaling. For example, the relay UE 200 may include the information on the relay UE 200 into a part of the SIP header, such as a via header, or the SDP. Further, the relay UE 200 may inform the SIP server of the relationship between the remote UE 300 and the relay UE 200 by adding the aforementioned group ID, the ProSe Group IP multicast address, or both the group ID and the ProSe Group IP multicast address to the SIP signaling.

Further, the registration processing SIP signaling is not limited to a case where it is directly transmitted from the remote UE 300 to the MCPTT server 100. For example, after the registration processing SIP signaling has been transmitted from the remote UE 300 to the relay UE 200 and terminated by the relay UE 200 once, the relay UE 200 may generate a new registration processing SIP signaling for remote UE and transmit it to the MCPTT server 100. In this case, instead of the remote UE 300 explicitly including, into the registration processing SIP signaling that the remote UE 300 generates, the information on the relay UE 200 to which the remote UE 300 is connected, as mentioned above, the relay UE 200 may explicitly include the information on the relay UE 200 into the registration processing SIP signaling for remote UE. For example, the relay UE 200 may include the information on the relay UE 200 into a part of the SIP header, such as a via header, or the SDP. Further, the relay UE 200 may inform the SIP server of the relationship between the remote UE 300 and the relay UE 200 by adding the aforementioned group ID, the ProSe Group IP multicast address described in 3GPP TS 23.303 v13.0.0, "Proximity-based services (ProSe); Stage 2", or both the group ID and the ProSe Group IP multicast address to the SIP signaling.

In the MCPTT server 100, when the receiver 101 receives the registration processing SIP signaling, the detector 102 detects a relationship (relationship of connection) between the remote UE 300 that transmitted the SIP signaling and the relay UE 200 to which the remote UE 300 is connected (ST103). The relationship between the relay UE 200 and the remote UE 300 may be detected, for example, by using the information on the relay UE 200 included in the SIP signaling or by using a comparison of the IP address with those of the other already-registered remote UEs 300. In a case of using a comparison of IP addresses, the detector 102 may detect the relationship between the relay UE 200 and the remote UE 300 by comparing IP addresses (in the case of IPv4) or IP address prefixes (in the case of IPv6). Further, even in a case where the information on the relay UE 200 is included in the via header or the like of the SIP header, the MCPTT server 100 may confirm, with reference to the information on the already-registered relay UE 200, whether the information included in the via header is really the information on the relay UE 200. Further, in a case where the SIP signaling includes the group ID, the ProSe Group IP multicast address, or both the group ID and the ProSe Group IP multicast address, the MCPTT server 100 may detect, with use of this information, a relationship (relationship of connection) between the remote UE 300 and the relay UE 200 to which the remote UE 300 is connected.

For example, in the example shown in FIG. 1, in a case where the UE3 to UE5, which are remote UEs 300, has performed user registration, the detector 102 of the MCPTT server 100 detects such a relationship that the UE2 is the relay UE 200 and the UE3, the UE4, and the UE5 are remote UEs 300 connected to the UE2.

The storage 103 of the MCPTT server 100 stores information indicating the relationship between the relay UE 200 and the remote UE 300 as detected by the detector 102 in ST103. In a case where the SIP signaling includes the group ID and/or the ProSe Group IP multicast address, the storage 103 also stores information on the group ID and/or the ProSe Group IP multicast address.

Next, the remote UE 300 performs MCPTT service communication start processing as described in 3GPP TS 23.179 v0.3.0, "Functional architecture and information flows to support mission critical communication services; Stage 2" and the like (ST105). For example, the remote UE 300 transmits an SIP INVITE signaling to the MCPTT server 100.

At this stage, the determiner 104 of the MCPTT server 100 determines whether it is necessary to establish (or update) a bearer (unicast bearer) for the remote UE 300 that transmitted the SIP INVITE signaling (ST106). Then, in a case where it is necessary to establish (or update) a bearer, the determiner 104 requests the PDN GW 400 to establish (or update) a bearer for the remote UE 300 through PCRF (Policy and Charging Rules Function; not illustrated) or the like as described in 3GPP TS 23.401 v13.3.0, "General Packet Radio Service (GPRS) enhancements for Evolved Universal Terrestrial Radio Access Network (E-UTRAN) access" and the like (ST107). Upon receiving the request to establish (or update) the bearer for the remote UE 300, the PDN GW 400 establishes (or updates) an EPC bearer for the remote UE 300 (ST108).

For example, the determiner 104 determines, on the basis of the information (i.e. the relationship between the relay UE 200 and the remote UEs 300) stored in the storage 300, the presence or absence of configuration of information (e.g. a TFT (Traffic Flow Template) or the like described in 3GPP TS 23.401 v13.3.0, "General Packet Radio Service (GPRS) enhancements for Evolved Universal Terrestrial Radio Access Network (E-UTRAN) access" and the like) that is needed to update an existing bearer or establish a new bearer. In making this determination, the determiner 104 may use other information, e.g. information such as an operator's policy preset in the MCPTT server 100 or the like.

Specifically, in a case where there already exists an EPS bearer for a voice packet for the relay UE 200, the determiner 104 may add a TFT for the remote UE 300 to this EPS bearer. In this case, the determiner 104 adds an uplink (i.e. the direction from the UE to the PDN GW 400) TFT (UL TFT). Meanwhile, as for the downlink (i.e. the direction from the PDN GW 400 to the UE), the determiner 400 may determine to add a downlink TFT (DL TFT) only in a case of sending a packet addressed to the remote UE 300 and not to add a downlink TFT in a case of sending no packet addressed to the remote UE 300. Further, in adding a downlink TFT, the determiner 104 may use the unicast IP address of the remote UE 300 or the ProSe Group IP multicast address as the destination IP address of the TFT.

Further, in a case where there already exits an EPS bearer for a voice packet for the relay UE 200, the determiner 104 may establish a new EPS bearer for a voice packet for the remote UE 300. In this case, the determiner 104 configures an uplink TFT. Meanwhile, as for the downlink, the determiner 104 may determine to configure a downlink TFT only in a case of sending a packet addressed to the remote UE 300 and not to configure a downlink TFT in a case of sending no packet addressed to the remote UE 300. Further, in configuring a downlink TFT, the determiner 104 may use the unicast IP address of the relay UE 200 or the remote UE 300 or the ProSe Group IP multicast address as the destination IP address of the TFT.

Further, in a case where the relay UE 200 has received a voice packet in the MBMS and no EPS bearer has been established for unicast reception (for downlink) of the voice packet (or in a case where no TFT has been configured), the determiner 104 may determine to simultaneously establish a downlink EPS bearer for the relay UE 200 (or configure a TFT) and to add a TFT for the remote UE 300 as mentioned above. Further, in configuring a downlink TFT, the determiner 104 may use the unicast IP address of the relay UE 200 or the remote UE 300 or the ProSe Group IP multicast address as the destination IP address of the TFT.

Further, in a case where the relay UE 200 has received a voice packet in the MBMS and no EPS bearer has been established for unicast reception (for downlink) of the voice packet (or in a case where no TFT has been configured), the determiner 104 may determine to establish a bearer for the remote UE 300 as mentioned above without establishing a downlink EPS bearer for the relay UE 200 (or configuring a TFT). Further, in configuring a downlink TFT, the determiner 104 may use the unicast IP address of the remote UE 300 or the ProSe Group IP multicast address as the destination IP address of the TFT.

It should be noted that this EPS bearer establishment processing may be performed after the registration processing. An example of bearer establishment that is performed after the registration processing is SIP signaling bearer establishment.

Voice Packet Communication Processing

Next, communication processing of a voice packet after completion of the registration processing, the communication start processing, and the bearer establishment processing, which have been described with reference to FIG. 5, is described.

Case 1: Voice Packet from UE Other than Relay UE 200 and Remote UEs 300

First, a process that is performed in a case where, as shown in FIG. 1, a UE (UE1) other than the relay UE 200 (UE2) and the remote UEs 300 (UE3 to UE5) has started speaking under a floor grant given from the MCPTT server 100 is described with reference to FIGS. 2 to 4 and 6.

Figure 6:
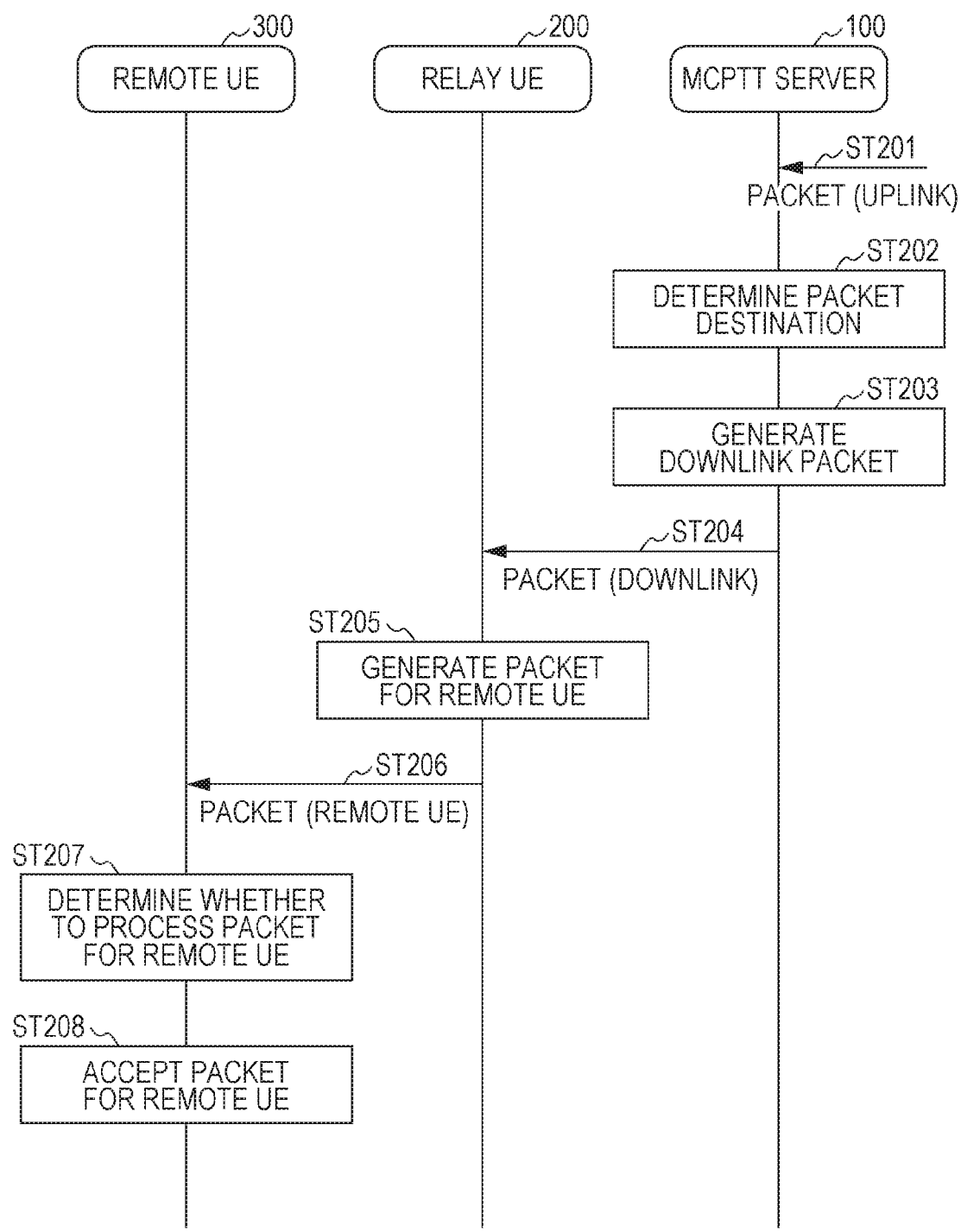
FIG. 6 is a sequence chart (Case 1) showing an operation at the time of voice communication according to Embodiment 1.

FIG. 6 is a sequence chart showing an example of an operation of voice packet communication processing according to Case 1.

In FIG. 6, the receiver 101 of the MCPTT server 100 receives an uplink voice packet (i.e. a voice packet that is transmitted from a UE given a floor grant (in FIG. 1, the UE 1)) (ST201). Upon receiving the uplink voice packet, the determiner 104 of the MCPTT server 100 determines, on the basis of the information (i.e. the relationship between the relay UE 200 and the remote UEs 300) stored in the storage 103, which UE to transmit this voice packet to as a destination (ST202). Specifically, the determiner 104 determines, as the destination UE of the voice data, only one of the relay UE 200 and the remote UEs 300 in the relationship stored in the storage 103. In making this determination, the determiner 104 may use other information, e.g. information such as an operator's policy preset in the MCPTT server 100 or the like.

Specifically, the determiner 104 determines to transmit the packet to the relay UE 200 (UE2) to which the remote UEs 300 are connected instead of transmitting the packet to remote UEs 300 subordinate to the relay UE 200 (UE2), such as the UE3 to UE5 shown in FIG. 1. Alternatively, the determiner 104 may determine to transmit the packet to one of the remote UEs 300 enjoying the same MCPTT service in connection with the relay UE 200. That is, with respect to a plurality of UEs including the relay UE 200 and the remote UEs 300, the determiner 104 determines only the relay UE 200 or one remote UE 300 as the destination UE instead of making each of the plurality of UEs a destination.

Further, the determiner 104 may determine to transmit the packet to the ProSe Group IP multicast address, which is allocated to the relay UE 200 and the remote UEs 300 or only the remote UEs 300. Further, in ST202, the determiner 104 determines the destination UE (destination) so that it matches the content of the EPS bearer established in FIG. 5. For example, the determiner 104 determines the destination UE of the packet with use of the destination IP address of the downlink TFT configured in ST106 of FIG. 5 (e.g. the unicast IP address of the relay UE 200 or the remote UE 300 or the ProSe Group IP multicast address).

The packet generator 105 of the MCPTT server 100 generates a downlink packet on the basis of a result of the determination made by the determiner 104 (ST203). That is, the packet generator 105 generates a voice packet to which header information addressed to the destination UE determined by the determiner 104 or header information addressed to the ProSe Group IP multicast address is appended. The packet (downlink) thus generated is transmitted to the destination UE (in FIG. 6, the relay UE 200; in FIG. 1, the UE2) via the transmitter 106 (ST204). The packet that is transmitted is transmitted with use of the EPS bearer (unicast) established or updated in FIG. 5.

The receiver 201 of the relay UE 200 receives the voice packet transmitted from the MCPTT server 100 (ST204). Alternatively, the relay UE 200 intercepts the voice packet even in a case where the voice packet is addressed to the remote UE 300. The relay UE 200 uses QCI (QoS Class Identifier; described in 3GPP TS 23.401 v13.3.0, "General Packet Radio Service (GPRS) enhancements for Evolved Universal Terrestrial Radio Access Network (E-UTRAN) access" and the like) or the like to determine whether the signal thus received is a voice packet. Then, in a case where the voice packet thus received or the voice packet thus intercepted is addressed to the unicast IP address of the relay UE 200 or the remote UE 300, the receiver 201 of the relay UE 200 outputs this voice to the packet generator 202. Further, in a case where the voice packet thus received is addressed to the ProSe Group IP multicast address, the receiver 201 does not output the voice packet to the packet generator 202 but transmits it via the transmitter 203.

The packet generator 202 changes the header information of the voice packet received from the receiver 201 and generates a packet for remote UE 300 so that each of the remote UEs 300 allocated the same group ID can receive the voice packet as one addressed to that remote UE 300 (ST205).

For example, the packet generator 202 rewrites the IP header of a received voice packet into a broadcast address or a multicast address. It should be noted that in a case where a multicast address is used, it is necessary that, by the time the remote UE 300 completes the communication start processing, the relay UE 200 and the remote UE 300 perform a process for participating in a multicast group. Further, the relay UE 200 may make an arrangement with the remote UE 300 in advance for the destination port number that is used in the transmission of a voice packet. Further, the ProSe Group IP multicast address may be used as a destination address.

The packet generated by the packet generator 202 (i.e. the packet addressed to the remote UE 300) is transmitted via the transmitter 203 (ST206). In this way, the relay UE 200 transmits, to all of the remote UEs 300 allocated the same group ID and connected to the relay UE 200, the voice packet that is transmitted from the MCPTT server 100.

It should be noted that in a case where only one remote UE 300 is connected to the relay UE 200, the relay UE 200 may transmit a packet to the unicast address of the remote UE 300 without using a broadcast address, a multicast address, or a ProSe Group IP multicast address.

The receiver 301 of the remote UE 300 receives the packet transmitted from the relay UE 200 (ST206).

The determiner 302 of the remote UE 300 determines whether to perform a process on the packet (for remote UE) thus received (ST207). Specifically, the determiner 302 determines, from the header information of the packet, whether the packet thus received is a voice packet addressed to the remote UE 300. The determination of the voice packet by the determiner 302 may be made by using a PPP (Per Packet Priority) described in 3GPP S2-151810, "LS reply on ProSe Priorities" and the like. Further, in a case where the determiner 302 has confirmed that the remote UE 300 is not currently given a floor grant or that another UE is given a floor grant, the determiner 302 determines that the voice date thus received is not voice data generated and transmitted by the remote UE 300.

In FIG. 6, the determiner 302 determines to perform a process on the packet thus received, as the packet thus received is a voice packet addressed to the remote UE 300 and the remote UE 300 is not given a floor grant.

The processor 303 of the remote UE 300 processes the packet on the basis of the determination made by the determiner 302. For example, as shown in FIG. 6, in a case where a result of the determination made by the determiner 302 is such that the packet is addressed to the remote UE 300 and is not a packet generated and transmitted by the remote UE 300, the processor 303 performs, for example, a process of accepting the packet thus received and delivering data (RTP packet) to a higher layer (RTP layer) (ST208).

Case 2: Voice Packet from Remote UE 300

Next, a process that is performed in a case where any of the remote UEs 300 (UE3 to UE5) has started speaking under a floor grant given from the MCPTT server 100 is described with reference to FIGS. 2 to 4 and 7.

Figure 7:
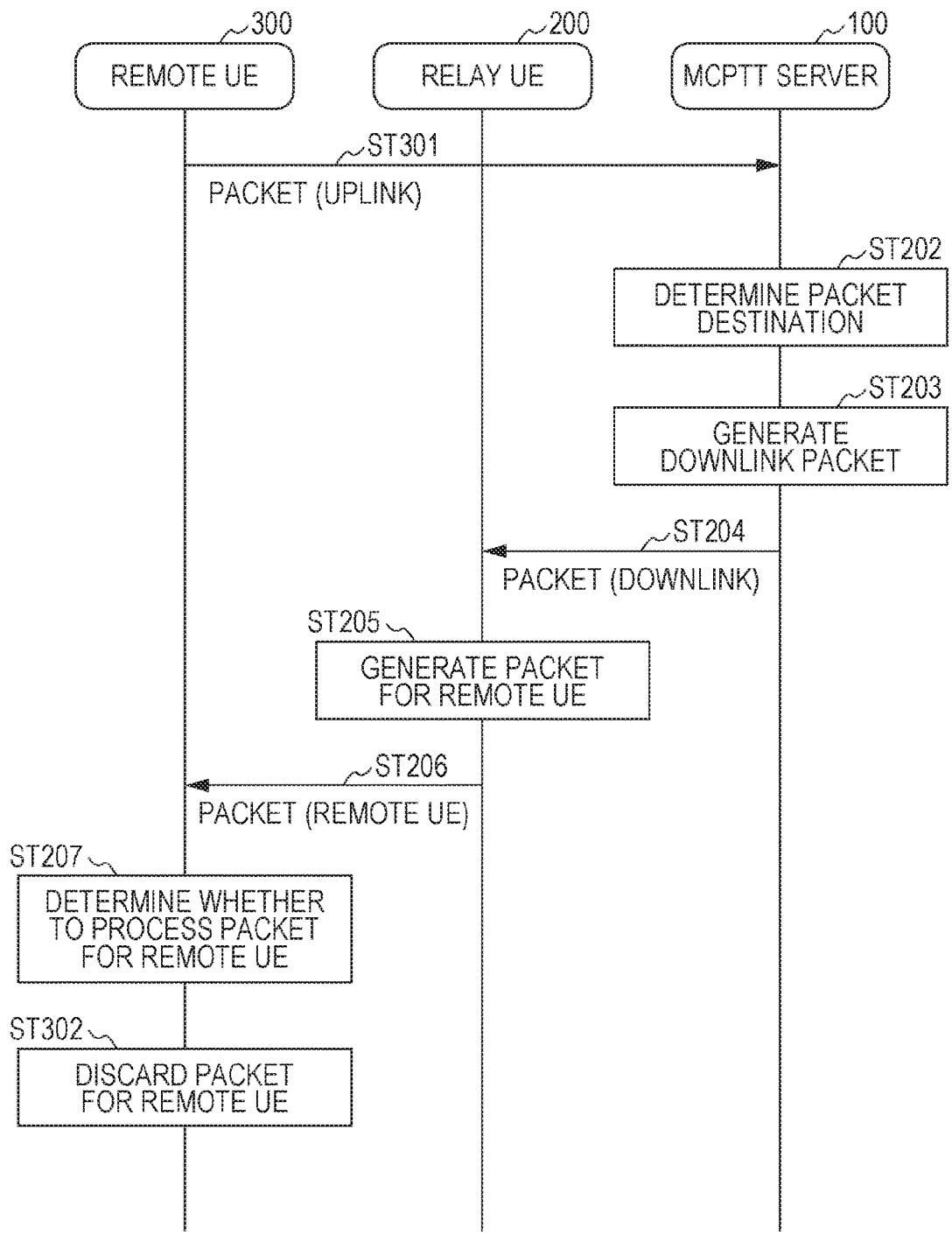
FIG. 7 is a sequence chart (Case 2) showing an operation at the time of voice communication according to Embodiment 1.

FIG. 7 is a sequence chart showing an example of an operation of voice packet communication processing according to Case 2. It should be noted that steps shown in FIG. 7 which are identical to those shown in FIG. 6 are given the same reference numerals and, as such, are not described below.

In FIG. 7, the remote UE 300 generates a voice packet and transmits the voice packet (uplink) to the MCPTT server 100 via the relay UE 200 (ST301).

At this stage, the voice packet (uplink) is sent to a remote UE 300 allocated the same group ID but given no floor grant, the determiner 302 of the remote UE 300 given no floor grant determines, from the destination IP address or the like, that the voice packet is not addressed to the remote UE 300, and the processor 303 discards the packet.

Upon receiving the uplink voice packet transmitted from the relay UE 200 (ST301), the MCPTT server 110 determines the destination UE of the voice packet (i.e. the relay UE 200 or one remote UE 300 or a group of UEs whose addresses are ProSe Group IP multicast addresses) as in Case 1 (ST202), generates a downlink packet (ST203), and transmits the packet (downlink) (ST204).

It should be noted that in a case where the UE from which the packet has been transmitted is a remote UE 300 and the remote UE 300 is the only remote UE 300 connected to the relay UE 200 and in a case where the relay UE 200 does not need to receive this packet (e.g. a case where the relay UE 200 has received a voice packet in the MBMS), the determiner 104 of the MCPTT server 100 may determine, on the basis of the information stored in the storage 103, not to transmit the packet to the relay UE 200.

Further, as in Case 1, the relay UE 200 receives the voice packet transmitted from the MCPTT server 100 (ST204), changes the header information of the voice packet so that remote UEs 300 subordinate to the relay UE 200 can receive the voice packet (ST205), and transmits a packet for remote UE thus generated (ST206). Alternatively, in a case where the voice packet thus received is addressed to the ProSe Group IP multicast address, the receiver 201 of the relay UE 200 does not output the voice packet to the packet generator 202 but transmits it via the transmitter 203.

The determiner 302 of the remote UE 300 determines whether to perform a process on the packet (for remote UE) thus received (ST207). Specifically, the determiner 302 determines, from the header information of the packet, whether the packet thus received is a voice packet addressed to the remote UE 300. Further, in a case where the determiner 302 has confirmed that the remote UE 300 is not currently given a floor grant or that another UE is given a floor grant, the determiner 302 determines that the voice date thus received is not voice data generated and transmitted by the remote UE 300.

In FIG. 7, the determiner 302 determines that the packet thus received is a voice packet generated and transmitted by the remote UE 300, as the packet is addressed to the remote UE 300 but the remote UE 300 is given a floor grant. That is, the determiner 302 determines to discard the packet thus received without performing a process on it.

The processor 303 of the remote UE 300 processes the packet on the basis of the determination made by the determiner 302. In FIG. 7, since it has been determined that the packet thus received is a voice packet generated and transmitted by the remote UE 300, the processor 303 performs a process of discarding the voice packet (ST302).

Case 3: Voice Packet from Remote UE 300

Next, a process different from Case 2 that is performed in a case where any of the remote UEs 300 (UE3 to UE5) has started speaking under a floor grant given from the MCPTT server 100 is described with reference to FIGS. 2 to 4 and 8.

Figure 8:
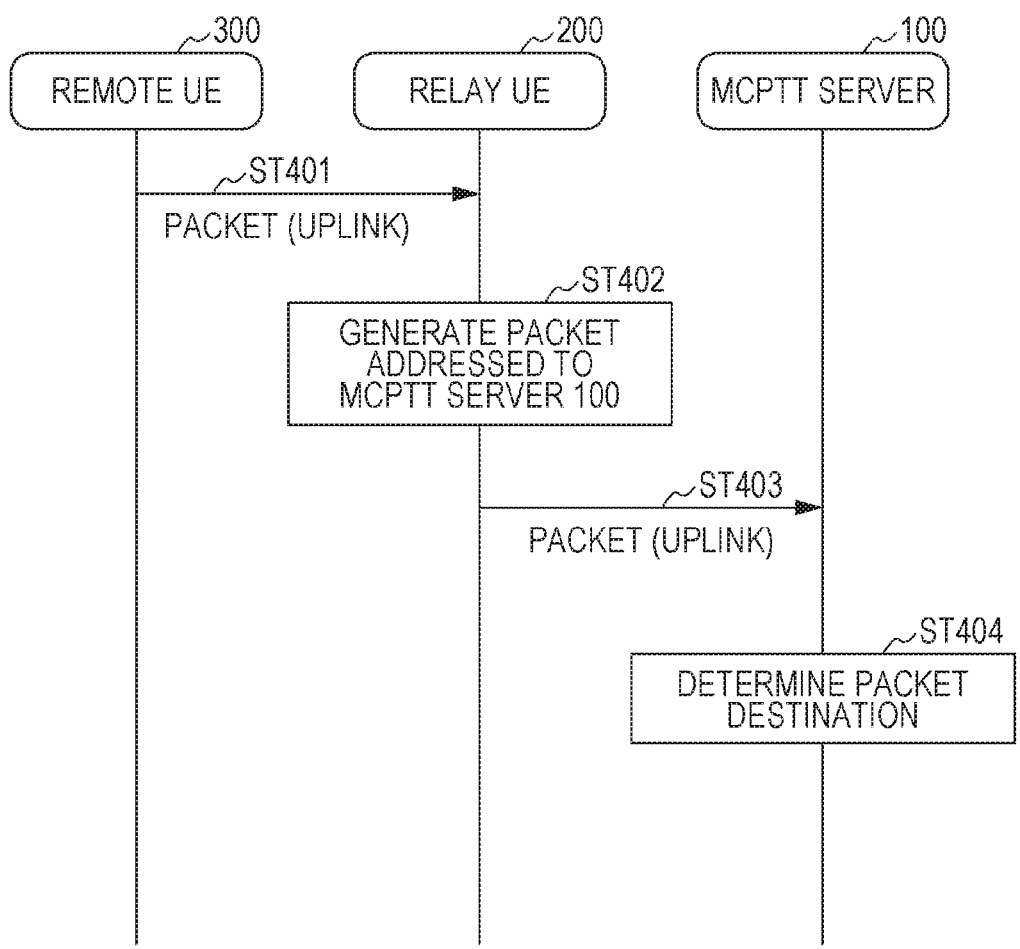
FIG. 8 is a sequence chart (Case 3) showing an operation at the time of voice communication according to Embodiment 1.

FIG. 8 is a sequence chart showing an example of an operation of voice packet communication processing according to Case 3.

In FIG. 8, the remote UE 300 generates a voice packet addressed to a broadcast address, a multicast address, a ProSe Group IP multicast address, or the like and transmits the voice packet to the relay UE 200 and remote UEs 300 that have the same group ID (ST401).

At this point in time, the determiner 302 of a remote UE 300 given no floor grant determines that the voice packet is addressed to the remote UE 300, and the processor 303 performs, for example, a process of accepting the packet thus received and delivering data (RTP packet) to a higher layer (RTP layer).

The receiver 201 of the relay UE 200 receives the voice packet transmitted from the remote UE 300 (ST401). The relay UE 200 uses Per Packet Priority, described in 3GPP S2-151810, "LS reply on ProSe Priorities", or the like to determine whether the signal thus received is a voice packet.

Then, the receiver 201 of the relay UE 200 outputs the voice packet thus received to the packet generator 202.

Upon receiving the voice packet, the packet generator 202 performs a necessary process of, for example, changing the address of the header of the voice packet to the MCPTT server 110 and generates a packet whose source is the remote UE 300 and whose destination is the MCPTT server 100 (ST402).

The packet generated by the packet generator 202 (i.e. the packet addressed to the MCPTT server 100) is transmitted via the transmitter 203 (ST403). In this way, the relay UE 200 transmits, to the MCPTT server 100, the voice packet that is transmitted from the remote UE 300.

When the MCPTT server 100 receives the uplink voice packet transmitted from the relay UE 200 (ST403), the determiner 104 of the MCPTT server 100 may determine, on the basis of the information stored in the storage 103, that the UE from which the packet has been transmitted is a remote UE 300 and a UE having the same group ID (the relay UE 200 or a remote UE 300) has already received this voice packet and determine not to transmit the packet to the relay UE 200 or the remote UE 300 (ST404).

The foregoing has described operations according to Embodiment 1.

In this way, in the communication system according to Embodiment 1, the MCPTT server 100 retains the relationship between the relay UE 200 and the remote UEs 300 among UEs participating in an MCPTT group service. Moreover, at the time of voice communication, the MCPTT server 100 transmits a voice packet only to the relay UE 200 (or any one of the remote UEs 300) or a group of UEs whose addresses are ProSe Group IP multicast addresses. Moreover, the relay UE 200 transmits the voice packet thus received to the remote UEs 300 subordinate to the relay UE 200.

With this, in the EPS, only a packet for one UE (i.e. the relay UE 200) is transmitted even in a case where there is a remote UE 300 participating in the MCPTT group service. This makes it possible to prevent wasteful consumption of resources in the EPS (core network).

Further, the relay UE 200 distributes, to each of the remote UEs 300 subordinate to the relay UE 200 (i.e. the UEs allocated the same group ID), a voice packet that the MCPTT server 100 transmitted for one UE. This makes it possible to prevent radio resources from being wastefully consumed, without a packet for each UE being wastefully distributed to all UEs even in the case of ProSe communication between the relay UE 200 and the remote UEs 300.

Further, the relay UE 200 needs only distribute, to all of the remote UEs 300 allocated the same group ID, the voice packet that is transmitted from the MCPTT server 100 and does not need to manage group IDs for each separate remote UE 300. This makes it possible to suppress an increase in processing load of the relay UE 200.

For the reason noted above, Embodiment 1 makes it possible, in the MCPTT service, to reduce consumption of core network resources and radio resources while suppressing an increase in processing load of the relay UE 200.

Embodiment 2

Embodiment 2 describes a method by which each individual remote UE 300 performs direct (one-to-one) communication with the relay UE 200 without using the group ID.

In addition to the group ID, the ProSe function in the MCPTT server 100 gives the relay UE 200 and the remote UEs 300 Layer 2 IDs (hereinafter referred to as "direct communication ID") that is needed for direct communication in the UE-to-Network relay. These direct communication IDs may be distributed when the relay UE 200 and the remote UE 300 have entered into a relay UE-remote UE relationship or may be distributed in advance before the relay UE 200 and the remote UE 300 enter into a relay UE-remote UE relationship. Further, these direct communication IDs may be IDs that are given without overlaps to all UEs participating in the same MCPTT service or may be those which are given without overlaps to a relay UE and remote UEs connected to the same relay UE. Further, the direct communication IDs may be given to the remote UEs not by the ProSe function in the MCPTT server 100 but by the relay UE. Further, these direct communication IDs may be ProSe UE IDs described in 3GPP TS 23.303 v13.0.0, "Proximity-based services (ProSe); Stage 2".

Registration Processing of Remote UE

As to the registration processing of a remote UE in Embodiment 2, it is not necessary to add a new function to the remote UEs 300, the relay UE 200, and the MCPTT server 100. Processes such as the registration processing, the communication start processing, and the bearer establishment processing are performed without regard to the relationship between the relay UE 200 and the remote UEs 300.

Voice Packet Communication Processing

Voice packet communication processing according to Embodiment 2 is described with reference to FIGS. 1 to 4, 9, and 10.

Figure 9:
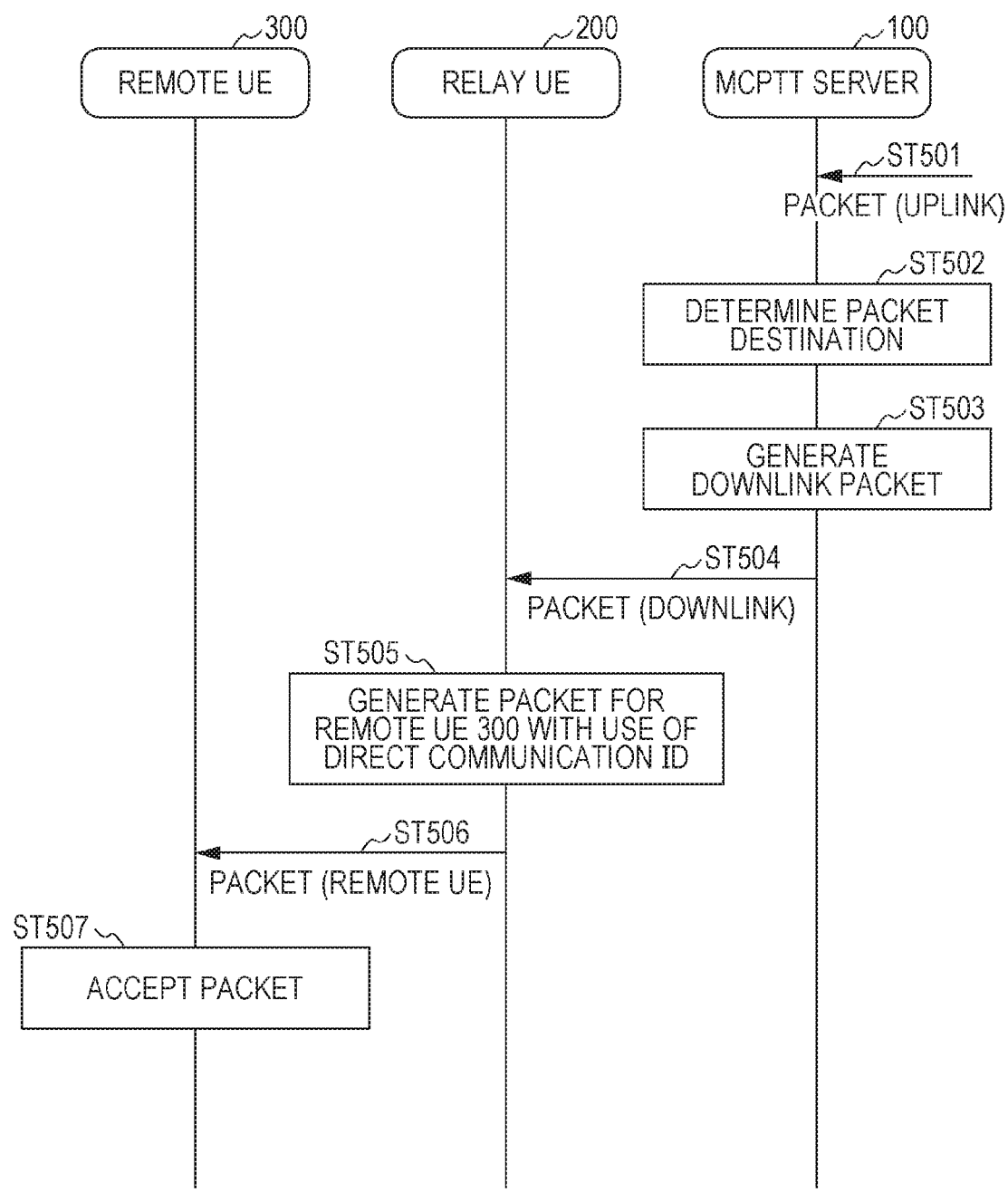
FIG. 9 is a sequence chart showing an operation at the time of voice communication according to Embodiment 2.

FIG. 9 is a sequence chart showing an example of an operation of voice packet communication processing according to Embodiment 2.

In FIG. 9, the receiver 101 of the MCPTT server 100 receives an uplink voice packet (i.e. a voice packet that is transmitted from a UE given a floor grant (in FIG. 1, the UE1)) (ST501). Upon receiving the uplink voice packet, the determiner 104 of the MCPTT server 100 determines to send the voice packet to all UEs that receive downlink voice packets with EPS bearers, excluding the UE that transmitted the uplink voice packet (ST502). It should be noted that the same determination is made even if the source of the uplink voice packet is a remote UE 300. The packet generator 105 of the MCPTT server 100 generates a downlink packet on the basis of a result of the determination made by the determiner 104 (ST503). The packet (downlink) thus generated is transmitted to a destination UE via the transmitter 106 (ST504).

The receiver 201 of the relay UE 200 receives the voice packet transmitted from the MCPTT server 100 (ST504).

The packet generator 202 of the relay UE 200 generates a packet for the remote UE 300 with use of the direct communication ID (ST505). Specifically, the packet generator 202 performs a Layer 2 process as described in 3GPP TS 36.300 v13.0.0, "Evolved Universal Terrestrial Radio Access (E-UTRA) and Evolved Universal Terrestrial Radio Access Network (E-UTRAN); Overall description: Stage 2" and 3GPP TR 36.321 v12.6.0, "Evolved Universal Terrestrial Radio Access (E-UTRA); Medium Access Control (MAC) protocol specification" so that the IP address of the remote UE 300 and the direct communication ID of the remote UE 300 match. It should be noted that the exchange of direct communication IDs between the relay UE 200 and the remote UE 300 may be performed when the remote UE 300 discovers the relay UE 200 or, as mentioned above, the relay UE 200 may allocate a direct communication ID to the remote UE 300.

Figure 10:
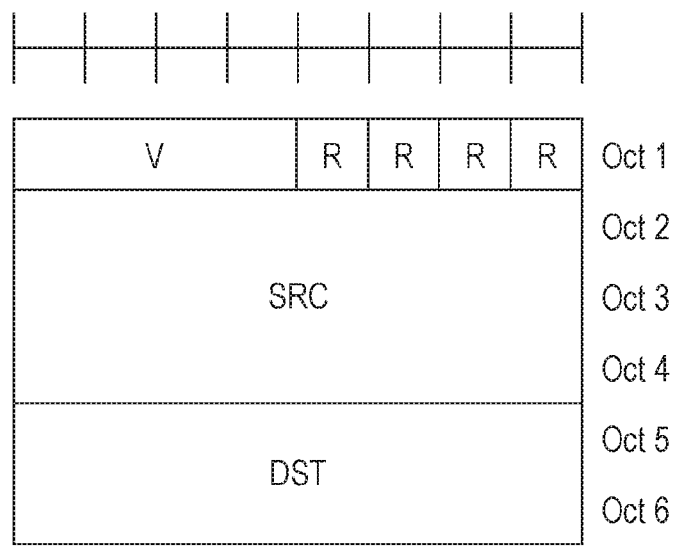
FIG. 10 is a diagram showing an example of a sidelink MAC subheader.

FIG. 10 shows a sidelink MAC (Medium Access Control) subheader described in 3GPP TR 36.321 v12.6.0, "Evolved Universal Terrestrial Radio Access (E-UTRA); Medium Access Control (MAC) protocol specification". The packet generator 202 enters a direct communication ID associated with the IP address of the remote UE 300 or a part of the direct communication ID into the DST field shown in FIG. 10 instead of entering the group ID. If the size of the direct communication ID (or a part thereof) does not fit into 16 bits as shown in FIG. 10, the relay UE 200 may change the size of the DST field. Further, in order to distinguish direct communication from normal communication based on a group ID, the relay UE 200 may set the value of the V field (MAC PDU format version number) shown in FIG. 10 for use in direct communication. Further, the relay UE 200 may use the direct communication ID of the relay UE 200 in the SRC field, too, and, if the size of the direct communication ID does not fit into 24 bits, may change the size of the SRC field. Further, Embodiment 2 may define a totally new MAC subheader for use in direct communication instead of changing the existing sidelink MAC subheader.

The packet transmitted from the transmitter 203 of the relay UE 200 is received by the receiver 301 of the remote UE 300 (ST506). The MAC sublayer of the remote UE 300 confirms by the direct communication ID that the packet is addressed to the remote UE 300, and performs a reception process (ST507).

The same direct communication processing as that mentioned above is performed also in a case where the remote UE 300 transmits a packet to the relay UE 200.

The foregoing has described operations according to Embodiment 2.

With this, by changing only the Layer 2 (described in 3GPP TS 36.300 v13.0.0, "Evolved Universal Terrestrial Radio Access (E-UTRA) and Evolved Universal Terrestrial Radio Access Network (E-UTRAN); Overall description; Stage 2") of the relay UE 200 and the remote UEs 300, changes to the relay UE 200, the remote UEs 300, and the MCPTT server 100 can be reduced and, at the same time, wasteful consumption of radio resources between the relay UE 200 and the remote UEs 300 can be reduced.

The foregoing has described each embodiment of the present disclosure.

It should be noted that the mechanism by which a remote UEs 300 described in the foregoing embodiments discards a packet transmitted by the remote UE 300 (see, for example, FIG. 7) may be applied in broadcast or multicast group communication.

Further, although the foregoing embodiments have described a communications system that performs voice packet communication, the communication system may be applied to other packets than voice packets, e.g. to floor control packets. Further, the communication system may be applied to packets other media (such as pictures) than voices.

Further, although the foregoing embodiments have been described by taking MCPTT as an example, they may be applied to another service based on a similar architecture.

Further, an aspect of the present disclosure is not limited to any of the embodiments described above and can be carried out in various modifications.

Further, while each embodiment has been described above by taking, as an example, a case where an aspect of the present disclosure is configured by hardware, the present disclosure can also be realized by software in cooperation with hardware.

Further, each functional block used in the description of each embodiment described above can be typically realized by an LSI such as an integrated circuit. Further, the integrated circuit may control each functional block used in the description of each embodiment described above and include an input terminal and an output terminal coupled thereto. These LSIs may be individually formed as one chip, or one chip may be formed so as to include a part or all of the functional blocks. The LSI here may be referred to as an IC (integrated circuit), a system LSI, a super LSI, or an ultra LSI depending on a difference in the degree of integration.

However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

An aspect of the present disclosure is useful in a communication system that provides an MCPTT service and a user terminal that utilizes a communication system.

What is claimed is:

1. A communication system comprising:
a communication node; and
a plurality of terminals including a relay terminal and a remote terminal that communicates with the communication node via the relay terminal,
wherein of the plurality of terminals, a terminal given a floor grant transmits voice data to the communication node and another terminal receives the voice data from the communication node,
the remote terminal transmits a first signaling for user registration of the remote terminal into the communication node,
the communication node detects a relationship of connection between the remote terminal that transmitted the first signaling and the relay terminal to which the remote terminal is connected,
upon receiving the voice data from the terminal given the floor grant, the communication node determines, as a destination terminal of the voice data, one of the relay terminal and the remote terminal that have the relationship of connection,
the communication node, in response to the remote terminal being determined as the destination terminal, generates a downlink packet based on the voice data, and transmits the downlink packet to the relay terminal with use of a unicast bearer, and
the relay terminal, in response to the remote terminal being determined as the destination terminal, receives the downlink packet from the communication node, updates the downlink packet such that all of the remote terminals connected to the relay terminal are able to receive the downlink packet, and transmits the updated downlink packet to all of the remote terminals connected to the relay terminal, and
all of the remote terminals connected to the relay terminal, in response to the remote terminal being determined as the destination terminal, receive the updated downlink packet from the relay terminal, and determine whether or not to process the updated downlink packet based on the floor grant.

2. The communication system according to claim 1, wherein the first signaling that the remote terminal transmits includes information on the relay terminal to which the remote terminal is connected, and
the communication node detects the relationship of connection with use of the information on the relay terminal.

3. The communication system according to claim 2, wherein the first signaling is an SIP (Session Initiation Protocol) signaling, and
the information on the relay terminal is included in a via header or an SDP (Session Description Protocol).

4. The communication system according to claim 1, wherein the relay terminal includes information on the relay terminal into the first signaling that is transmitted from the remote terminal, and
the communication node detects the relationship of connection with use of the information on the relay terminal.

5. The communication system according to claim 1, wherein after registration into the communication node, the remote terminal transmits a second signaling for starting communication, and
the communication node determines, on the basis of the relationship of connection, whether it is necessary to establish a unicast bearer for transmitting the voice data to the remote terminal that transmitted the second signaling and, in a case where the communication node has determined that it is necessary to establish the unicast bearer, the communication node requests for establishment of the unicast bearer.

6. The communication system according to claim 1, wherein the destination terminal is the relay terminal.

7. The communication system according to claim 1, wherein, upon receiving the voice data from the terminal given the floor grant, the communication node determines, as the destination terminal of the voice data, only a single remote terminal, and
the relay terminal, in response to the single remote terminal being determined as the destination terminal, intercepts the voice data addressed to the single remote terminal and transmits the voice data thus intercepted to multiple remote terminals.

8. The communication system according to claim 1, wherein the relay terminal changes header information of the voice data so that all of the remote terminals are able to receive the voice data.

9. The communication system according to claim 1, wherein in a case where the voice data is data transmitted from the remote terminal, the remote terminal discards the voice data.

10. The communication system according to claim 1, wherein each of the remote terminals connected to the relay terminal processes the updated downlink packet in response to another remote terminal of the remote terminals connected to the relay terminal being given the floor grant, and discards the updated downlink packet in response to being given the floor grant.

11. The communication system according to claim 1, wherein the communication node receives the voice data from the terminal given the floor grant via the relay terminal.

12. The communication system according to claim 1, wherein, in a case where each of the plurality of terminals is assigned a direct communication identification, the relay terminal transmits the updated downlink packet to all of the remote terminals connected to the relay terminal except for the terminal given the floor grant.

13. A relay terminal in a communication system in which of a plurality of terminals, a terminal given a floor grant transmits voice data to a communication node and another terminal receives the voice data from the communication node, the relay terminal comprising:
  a receiver, which, in operation, receives, with use of a unicast bearer for a destination terminal of the voice data, a data downlink packet that is transmitted from the communication node, the communication node generates the downlink packet based on the voice data, the destination terminal being determined by the communication node in a case where the communication node has received the voice data from the terminal given the floor grant and being one of the relay terminal or a remote terminal connected to the relay terminal, the remote terminal communicating with the communication node via the relay terminal;
  circuitry, which, in operation, updates, in response to the remote terminal being determined as the destination terminal, the downlink packet such that all of the remote terminals connected to the relay terminal are able to receive the downlink packet, and
  a transmitter, which, in operation, transmits the updated downlink packet to all of the remote terminals connected to the relay terminal,
  wherein all of the remote terminals connected to the relay terminal, in response to the remote terminal being determined as the destination terminal, receive the updated downlink packet from the relay terminal, and determine whether or not to process the updated downlink packet based on the floor grant.

14. A remote terminal for communicating with a communication node via a relay terminal in a communication system in which of a plurality of terminals, a terminal given a floor grant transmits voice data to the communication node and another terminal receives the voice data from the communication node, the remote terminal comprising:
  a transmitter, which, in operation, transmits a first signaling for user registration of the remote terminal into the communication node,
  wherein upon receiving the voice data from the terminal given the floor grant, the communication node determines, as a destination terminal of the voice data, one of the relay terminal and the remote terminal,
  the communication node, in response to the remote terminal being determined as the destination terminal, generates a downlink packet based on the voice data, and transmits the downlink packet to the relay terminal with use of a unicast bearer, and
  the relay terminal, in response to the remote terminal being determined as the destination terminal, receives the downlink packet from the communication node, updates the downlink packet such that the remote terminal is able to receive the downlink packet, and transmits the updated downlink packet to the remote terminal;
  a receiver, which, in operation, receives, in response to the remote terminal being determined as the destination terminal, the updated downlink packet that is transmitted from the relay terminal; and
  circuitry, which, in operation, determines, in response to the remote terminal being determined as the destination terminal, whether or not to process the updated downlink packet based on the floor grant.

15. A communication control method in a communication system in which of a plurality of terminals, a terminal given a floor grant transmits voice data to a communication node and another terminal receives the voice data from the communication node, the plurality of terminals including a relay terminal and a remote terminal that communicates with the communication node via the relay terminal, the communication control method comprising:
  transmitting, by the remote terminal, a first signaling for user registration of the remote terminal into the communication node;
  detecting, by the communication node, a relationship of connection between the remote terminal that transmitted the first signaling and the relay terminal to which the remote terminal is connected;
  upon receiving the voice data from the terminal given the floor grant, determining, by the communication node, as a destination terminal of the voice data, one of the relay terminal and the remote terminal that have the relationship of connection;
  in response to the remote terminal being determined as the destination terminal, generating, by the communication node, a downlink packet based on the voice data;
  transmitting, by the communication node, the downlink packet to the relay terminal with use of a unicast bearer;
  updating, by the relay terminal, the downlink packet such that all of the remote terminals connected to the relay terminal are able to receive the downlink packet,
  transmitting, by the relay terminal, the updated downlink packet to all of the remote terminals connected to the relay terminal; and
  determining, by all of the remote terminals connected to the relay terminal, whether or not to process the updated downlink packet based on the floor grant.

\* \* \* \* \*